(12) United States Patent
Bali et al.

(10) Patent No.: US 7,836,025 B1
(45) Date of Patent: Nov. 16, 2010

(54) METHOD AND APPARATUS FOR USING POINTERS WITHIN A NONVOLATILE SYSTEM MEMORY OF A NETWORK FILE COMPUTER SYSTEM

(75) Inventors: Naveen Bali, Sunnyvale, CA (US); Joseph Tupy, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 371 days.

(21) Appl. No.: 11/901,482

(22) Filed: Sep. 18, 2007

(51) Int. Cl.
*G06F 17/30* (2006.01)

(52) U.S. Cl. .................. 707/687; 707/690; 707/691; 707/674; 707/678; 707/679; 711/154; 711/156; 711/114; 711/161; 714/24; 714/42

(58) Field of Classification Search .............. 707/200, 707/201, 204, 203, 10, 687, 690, 691, 674, 707/678, 679, 682; 711/114, 162, 113; 714/24, 714/42; 709/202
See application file for complete search history.

(56) References Cited

U.S. PATENT DOCUMENTS

| | | | |
|---|---|---|---|
| 6,549,977 B1 * | 4/2003 | Horst et al. ............. 711/113 |
| 6,567,892 B1 * | 5/2003 | Horst et al. ............. 711/114 |
| 6,775,794 B1 * | 8/2004 | Horst et al. ............. 714/42 |
| 6,993,537 B2 * | 1/2006 | Buxton et al. ........... 707/104.1 |
| 7,143,249 B2 * | 11/2006 | Strange et al. .......... 711/162 |
| 7,231,547 B2 * | 6/2007 | Moiroux et al. ......... 714/24 |
| 7,251,749 B1 * | 7/2007 | Fong et al. ............. 714/20 |
| 7,284,030 B2 * | 10/2007 | Ackaouy et al. ......... 709/202 |
| 7,325,109 B1 * | 1/2008 | Muppalaneni et al. ..... 711/162 |
| 7,373,366 B1 * | 5/2008 | Chatterjee et al. ....... 707/204 |
| 7,389,379 B1 * | 6/2008 | Goel et al. ............. 711/112 |
| 7,389,396 B1 * | 6/2008 | Goel et al. ............. 711/167 |
| 7,562,189 B2 * | 7/2009 | Hamilton et al. ........ 711/114 |
| 7,613,743 B1 * | 11/2009 | Giampaolo et al. ....... 707/203 |
| 7,620,669 B1 * | 11/2009 | Novick et al. .......... 1/1 |

* cited by examiner

*Primary Examiner*—Jean M Corrielus
(74) *Attorney, Agent, or Firm*—Leon S. Erikson; John R. Ley

(57) ABSTRACT

A nonvolatile system memory of a server of a network file computer system temporarily stores data received from client computers prior to the data being stored on a mass storage device. A single copy of the data and pointers which corresponds to the memory addresses of the data are stored in a temporary memory storage portion, preferably partitioned from nonvolatile system memory. The pointers are used to access the data to enable the transfer and writing of the data from the temporary memory storage to the mass storage device. Writing the data occurs during the normal operation of the network file computer system or after an unclean shutdown. The use of the pointers increases the performance of the network file computer system by conserving system memory storage space and reducing system memory traffic.

9 Claims, 6 Drawing Sheets

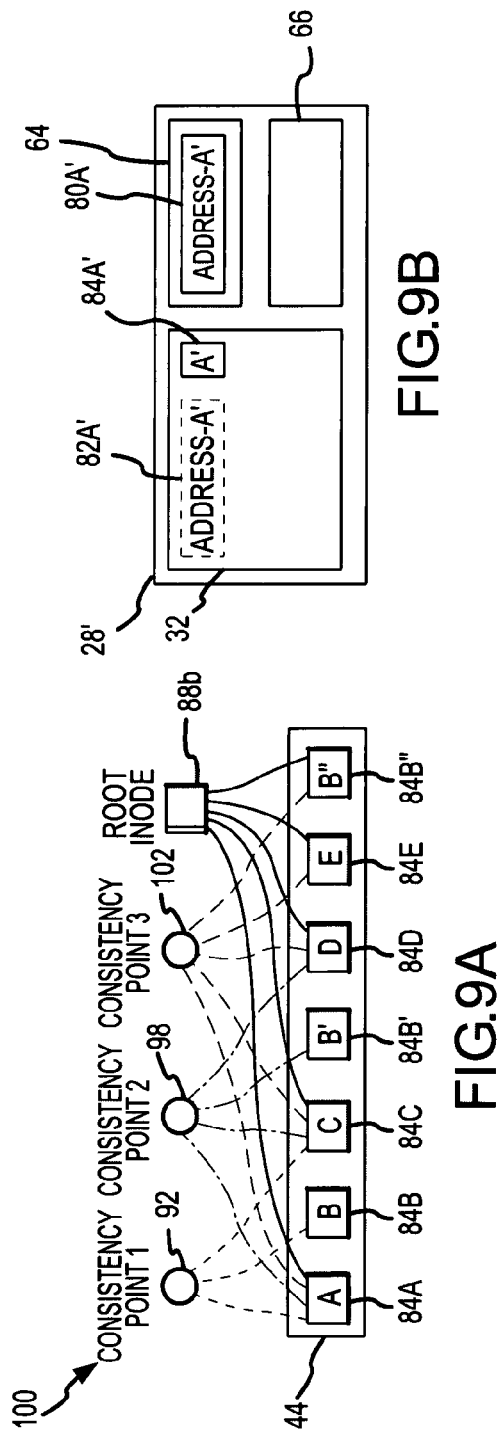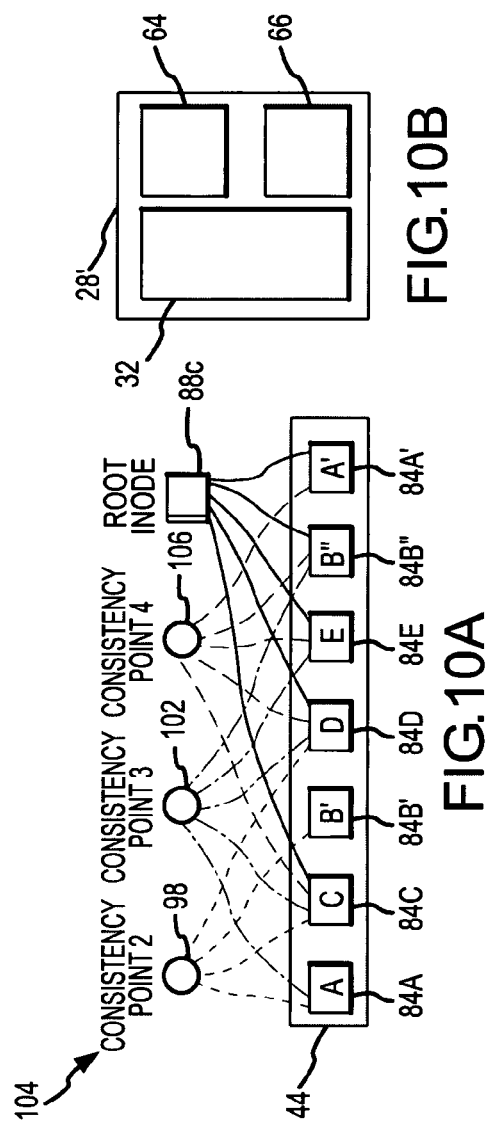

METHOD AND APPARATUS FOR USING POINTERS WITHIN A NONVOLATILE SYSTEM MEMORY OF A NETWORK FILE COMPUTER SYSTEM

This invention relates to the management of data associated with a network file computer system, and more specifically, to a new and improved method and apparatus that responds to client requests to create, edit, or otherwise manage the data with the use of pointers within a nonvolatile system memory of the computer system, thereby conserving system memory storage space and reducing system memory traffic.

BACKGROUND OF THE INVENTION

A network file computer system includes computers, known as clients, which allow remote access and sharing of data files of a file system as if the data files were stored locally on a hard disk drive of each client computer. The network file computer system is managed by another computer, known as a server. Requests from clients are received by and serviced through the server computer. The data files indicated by the client requests are made available by actions of the server and the clients executing a network file system protocol or code. The network file system protocol governs and establishes procedures and the actions within the network file computer system for responding to and servicing client requests.

The network file system protocol is a part of a mass storage operating system which controls an entire mass data storage computer system formed by one or more network file computer systems. The network file system protocol manages the sharing of data files between the client computers and the server computer. The network file system protocol allows the clients to conduct the basic operations of deleting, creating, editing, and reading data files stored on the server. Well-known network file system protocols are the Network File System (NFS), which is commonly used by the well-known UNIX operating system and the Common Internet File System (CIFS). Enhancements in the performance offered by CIFS and NFS are available from a Write Anywhere File Layout (WAFL) file system developed by Network Appliance, Inc. of Sunnyvale, Calif., the assignee of the present invention. WAFL is optimized for network environments where the servers are specifically tailored to provide a file system service through another network file system protocol, such as NFS and CIFS. WAFL provides performance enhancements which are not otherwise realized.

A typical network file computer system includes multiple nonvolatile mass storage devices in the form of hard disk drives, or other media storage devices such as optical media and solid state electrical devices. The hard disk drives are interconnected in groups and operate as a conventional redundant array of independent (or inexpensive) disks (RAID). Organizing and controlling the disk drives as a RAID group achieves substantial and well-known benefits of redundancy and protection against corruption for the data stored on the disk drives. The hard disk drives in each RAID group communicate with a central processing unit (CPU) or processor, which basically controls the transfer of data to and from the hard disk drives. A system memory is connected to the CPU. The system memory typically stores includes a portion which functions as temporary storage to hold data to be written on the hard disk drives. When the data has been successfully written to the hard disk drives, that data is erased and/or overwritten in the temporary storage memory. The data is written from the temporary storage memory to the hard disk drives only when those hard disk drives are not otherwise occupied by the execution of other previous or higher priority commands, thereby avoiding decreases in efficiency by not attempting to write the data when the hard disk drives are busy.

An unclean shutdown can adversely affect data to be written to the hard disk drives. An unclean shutdown refers to an unexpected interruption in operation of the network file computer system, usually as a result of an unexpected interruption in the supply of commercial electrical power to the computer system. Pending client requests to write data to the hard disk drives will not be successfully executed when the network file computer system ceases to function as a result of an unclean shutdown. In addition and because of the unexpected shutdown, it may be impossible to determine or reconstruct the pending client requests which were not successfully executed. The inability to reconstruct the previous state of the network file computer system prior to shut down is what gives rise to the indeterminate or "unclean" state.

Storing the data in the temporary storage portion of the system memory avoids adverse effects due to an unexpected interruption, such as an unclean shutdown, but only if the temporary storage memory is nonvolatile. One typical way of making the temporary storage memory nonvolatile is to supply it with its own source of backup electrical power, usually from a battery. The battery assures that the temporary storage memory is not susceptible to data loss and will continue to store the data in the event of a power interruption. The nonvolatile temporary memory stores the data until it has been successfully written to the disk drive. When the data has been successfully written to the hard disk drive, the data in the temporary storage memory is erased or overwritten. Of course, once data is stored on a hard disk drive, that storage is nonvolatile due to the inherent magnetic effects of the hard disk drive.

For every client request to write data to the disk drives, two copies of the same data are typically made and stored in the temporary storage memory. Separately storing the additional or redundant copies of the data is necessary for some network file system protocols, such as WAFL, because the file system protocol relies upon the second complete copy of the data to recover after the unclean shutdown. Absent the second copy of the data, the network file system cannot recover the data that failed to be written to the hard disks prior to the unclean shutdown.

Making two copies of the data in the temporary storage memory consumes computational resources and increases the amount of data traffic with the temporary storage portion of the system memory, all of which reduces the overall efficiency and throughput of the network file computer system. The necessity to store a redundant copy of the data also consumes the temporary storage memory, thereby requiring larger amounts of system memory.

SUMMARY OF THE INVENTION

The present invention eliminates the need to duplicate data within a nonvolatile memory that is used as a temporary storage memory for data waiting to be written to hard disk drives of the network file computer system. Only a single copy of the data needs to be stored in the system memory to assure that the data can be written to a hard disk during the normal operation of the computer system and efficiently recovered and subsequently written efficiently to a hard disk drive after an unclean shutdown. The efficiency and data throughput of the network file computer system is increased by reducing the number of data write operations, since only a single data write operation to the hard disk drive is required after the data is stored in the system memory. The amount of system memory consumed by write requests is reduced, or alternatively more temporary storage memory in the system memory is available to service more write requests, since only a single copy of the data needs to be stored in the system memory. The invention has various aspects in accordance with these and other features.

One aspect of the invention involves a method of storing data to nonvolatile mass storage in a network file computer system which includes a server computer and a plurality of client computers which execute a file system protocol. The server computer includes a system memory connected to a battery to provide an alternate source of power to make the system memory nonvolatile. The nonvolatile system memory is partitioned into a temporary storage portion which comprises memory buffers and a nonvolatile log. The method itself comprises sending data and a client request to store the data in the mass storage from one of the client computers to the server computer, temporarily storing a single copy of the data in the memory buffers of the temporary storage portion of the partitioned nonvolatile system memory, recording a pointer within the nonvolatile log as a part of the client request, identifying with the pointer a memory address within the temporary storage portion of the nonvolatile system memory wherein the single copy of the data is temporarily stored, and using the nonvolatile log including the pointer stored in the nonvolatile log to access the single copy of the data stored in the memory buffers and perform the client request by writing the data to the mass storage.

Another aspect of the invention involves a method of storing data to nonvolatile mass storage in a network file computer system which includes a server computer and a plurality of client computers which execute a file system protocol, the server computer including a nonvolatile system memory. The method comprises sending data and a client request to store the data in the mass storage from a client computer to the server computer, temporarily storing a single copy of the data in the nonvolatile system memory, establishing a nonvolatile log which defines the data and each client request in the nonvolatile system memory, establishing a pointer as a part of the nonvolatile log for each client request with the pointer identifying a memory address within the nonvolatile system memory wherein to a single copy of the data is temporarily stored, and using the nonvolatile log including the pointer stored in the nonvolatile system memory to access the single copy of the data stored in the nonvolatile system memory and perform the client request by writing the data to the mass storage upon restarting the network file computer system after an unclean shutdown.

A further aspect of the invention involves a network file computer system which comprises a plurality of client computers, a server computer, a nonvolatile mass storage device for storing data, and a communication path connecting the client computers, the server computer and the mass storage device by which to communicate data, client requests and other information between the server and client computers and the mass storage device. A nonvolatile system memory is included within the server, and the nonvolatile system memory includes memory buffers and a nonvolatile log portion. The server and the client computers execute programmed instructions which establish a network file system protocol that governs the storage of data in the mass storage device in response to client requests originated by the client computers. The network file system protocol operatively stores temporarily in the memory buffers a single copy of data originating from the client computers at a predetermined address within the memory buffers, stores temporarily in the nonvolatile log portion a pointer identifying the predetermined address of the single copy of the data stored in the memory buffers, stores temporarily in the nonvolatile log portion a client request containing information describing the storage of the single copy of the data stored in the memory buffers on the mass storage device, accesses the single copy of the data stored in the memory buffers by using the pointer stored in the nonvolatile log portion, and writes to mass storage device the accessed single copy of the data stored in the memory buffers in compliance with the client request stored in the nonvolatile log portion.

In some aspects of the invention, the nonvolatile system memory may be divided into nonvolatile log portions. The data associated with each of a plurality of client requests is stored in the memory buffers, and the pointer for the data associated with each client request is stored in one of the nonvolatile logs.

A more complete appreciation of the present invention and its scope, and the manner in which it achieves the above and other improvements, can be obtained by reference to the following detailed description of presently preferred embodiments taken in connection with the accompanying drawings, which are briefly summarized below, and the appended claims.

BRIEF DESCRIPTION OF THE DRAWINGS

FIGS. 5A and 5B, FIGS. 6A and 6B, FIGS. 7A and 7B, FIGS. 8A and 8B, FIGS. 9A and 9B, and FIGS. 10A and 10B are illustrations and block diagrams, respectively, of the root inode and the system memory shown in FIG. 4 during five different exemplary events of operation and status of the of the network file computer system shown in FIG. 2.

DETAILED DESCRIPTION

Figure 1:
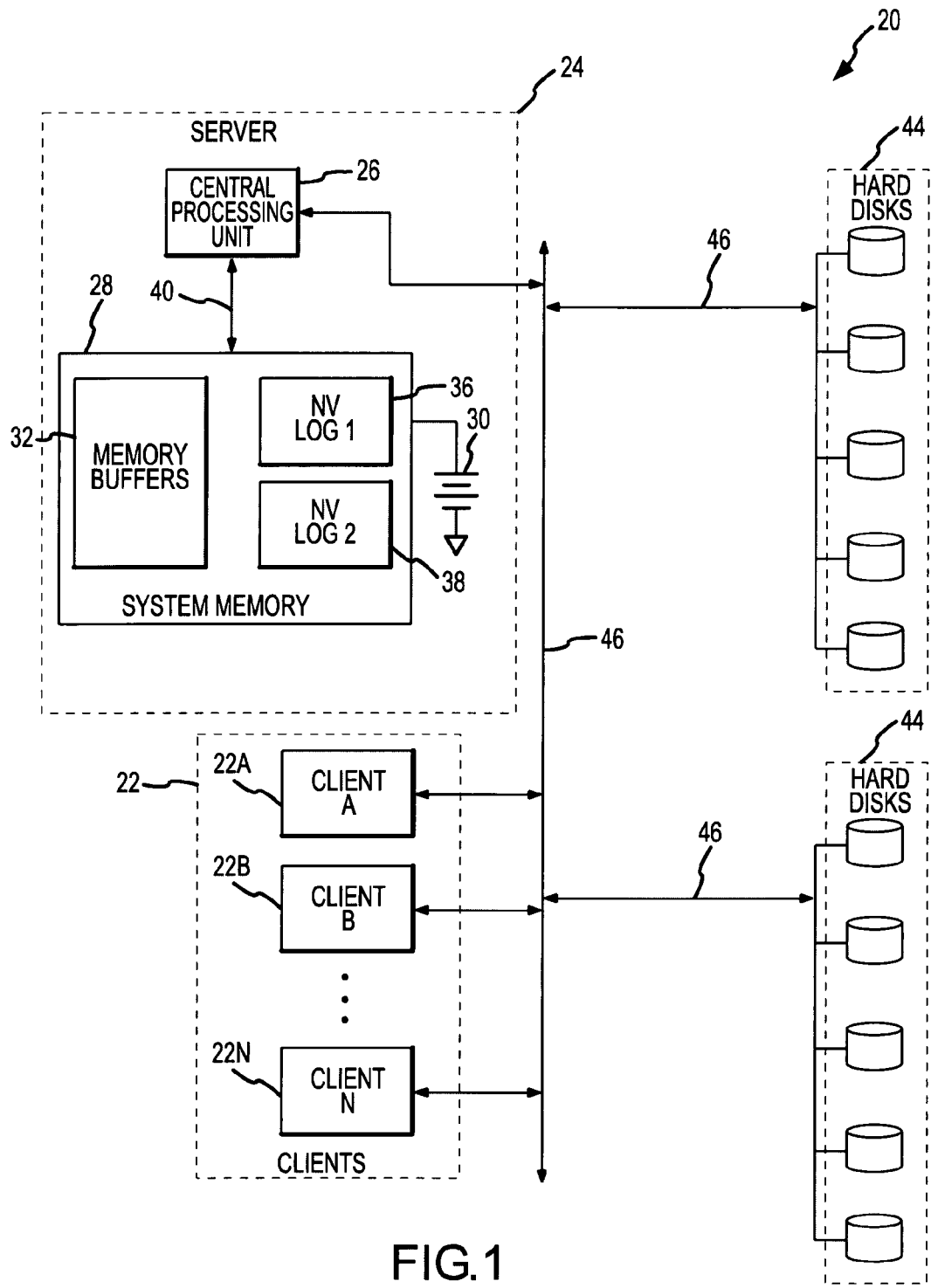
FIG. 1 is a block diagram of a prior art network file computer system.

The aspects of the present invention are better understood by contrast to the characteristics of a typical prior art network file computer system 20 with clients 22 and a server 24, shown in FIG. 1. Multiple ones of the network file computer system 20 may be interconnected in a conventional network manner to form a conventional mass data storage computer system. The server 24 of the network file computer system 20 includes a central processing unit (CPU) or processor 26 and a system memory 28. The processor 26 and the system memory 28 are normally powered by conventional commercial electrical power. However, the system memory 28 has a battery 30 as a backup power supply to ensure that the memory 28 is continuously operative and therefore nonvolatile in the event that the primary commercial electrical power source is turned off or fails as would occur in an unclean shutdown. As a result, data stored in the system memory 28 remains continuously viable.

The system memory 28 includes nonvolatile (NV) memory buffers 32 and nonvolatile (NV) logs 36 and 38. Data is transmitted to the NV memory buffers 32 and the first and second NV logs 36 and 38 over a conventional system memory bus 40, under the control of the processor 26. The memory buffers 32 and the first and second NV logs 36 and 38 are made nonvolatile as a result of the backup power supplied by the battery 30. The battery 30 assures continued retention of the data in the memory buffers 32 and the end of the logs 36 and 38 in the event that commercial power to the server 24 is interrupted.

The network file computer system 20 also includes at least one, and preferably multiple nonvolatile mass storage devices typically in the form of hard disk drives 44. The hard disk drives 44 are interconnected in groups and operate as a conventional redundant array of independent (or inexpensive) disks (RAID). The hard disk drives 44 of each RAID group communicate with the server 24 through a connection that includes a network communication link 46, such as that provided by conventional Ethernet or fibre channel network technology.

The system memory bus 40 and the network communications link 46 connect the clients 22, the server 24 and the disk drives 44, thereby facilitating the transfer of data between the clients 22, the disk drives 44, the system memory 28 and the processor 26.

Figure 2:
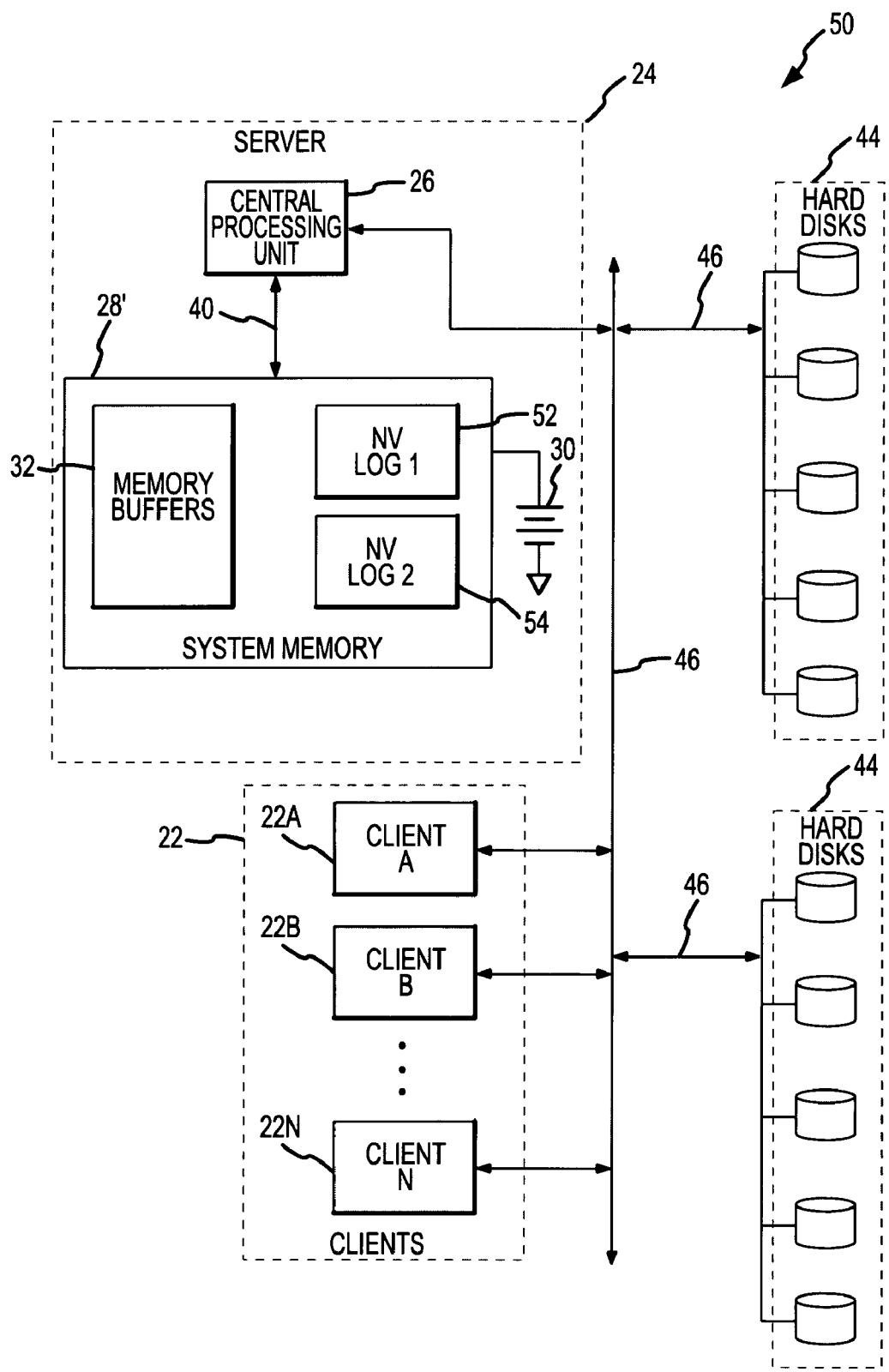
FIG. 2 is a block diagram of a network file computer system which employs the present invention.

Details concerning the present invention, as represented in an embodiment of a network file system 50, are shown in FIG. 2. The network file computer system 50 shown in FIG. 2 includes the same elements as previously discussed in connection with the prior art network file computer system 20 shown in FIG. 1, except with respect to a different system memory 28'. The network file computer system 50 has a nonvolatile system memory 28' which is partitioned or which otherwise contains separate memory components that form a temporary storage memory for temporarily stores data before that data is written to a mass storage device, exemplified by the hard disks 44. The system memory 28' is connected to the battery 30 to ensure a continuous source of power in the event the primary commercial source of power to the network computer system 50 fails, thereby creating non-volatility in the system memory. The temporary storage portion of the nonvolatile system memory 28' includes the nonvolatile (NV) memory buffers 32 for temporarily storing data which is to be written to the hard disks 44, and at least one but preferably first and second nonvolatile (NV) logs 52 and 54 to store pointers which allow the stored data in the memory buffers 32 to be accessed through the memory addresses of the data. The memory buffers 32 and the pointers within the NV logs 52 and 54 eliminate the need to create duplicate copies of data within the system memory 28', as is the case with the prior art network file storage system 20 (FIG. 1).

Figure 3:
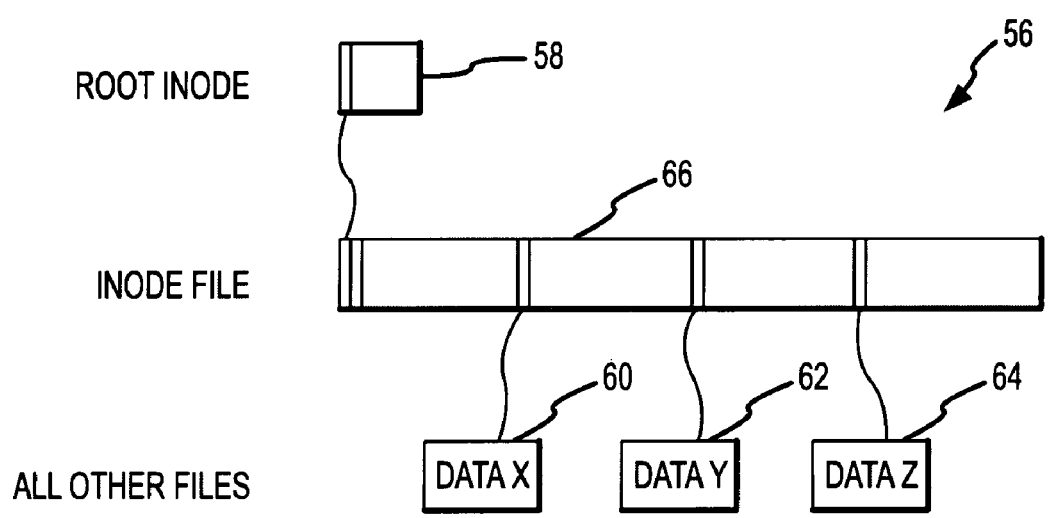
FIG. 3 is an illustration of hierarchical architecture of a prior art root inode which describes data files of a file system of the network file computer system shown in FIG. 2.

The network file system 50 (FIG. 2) employs a conventional file system architecture 56, as shown in FIG. 3. The file system architecture 56 is in the form of a tree structure to manage files within the file system. At the first level, or the root of the tree structure, is a root index node ("inode") 58. One or more inodes 58 allows access and contains all of the information and data for the file system to manage data files, represented by the exemplary data files 60, 62, and 64 on a single hard disk drive. The data files 60, 62 and 64 are located at the lowest level of the tree structure of the file system architecture. The data files 60, 62, and 64 are the files of interest to the clients 22 and the files that the clients 22 (FIG. 2) access when accomplishing the file management operations.

The root inode 58 contains an inode file 66 which is located within a second or intermediate layer of the file system architecture 56. The inode file 66 includes meta-data, or special-form data which is used by the network file system protocol to define, describe and manage the data files 60, 62, and 64. Upon the deleting, creating, or editing any of the data files 60, 62 or 64 by one of the clients 22 (FIG. 2), the inode file 66 is modified by the network file system protocol to create or edit the meta-data associated with the affected data file 60, 62 or 64. The meta-data describes both the operation performed on the data and characteristics of the changes in the data, in the affected data file 60, 62 or 64. The inode file 66 of the root inode 58 therefore contains all of the information necessary to describe the data in the affected data files 60, 62 and 64, as well as the operation performed on that data.

In general, an unclean shutdown can introduce inconsistencies in the data of data files of a network computer system, and may thereby ultimately lead to the loss and corruption of the data in those files. To avoid errors after an unclean shutdown, the data in the data files of the file system are checked for consistency after the computer is restarted. One conventional approach used by the UNIX operating system for checking the consistency of the data in the data files of a conventional network computer system is a file system check program known as "fsck." The conventional fsck program analyzes the file system for errors and makes corrections. However, when the complexity of the file system has grown through the addition of many data files, which is typical in conventional mass data storage computer systems, the time for the fsck program to analyze and correct the errors from an unclean shutdown is typically unacceptably long. The conventional network file computer system is not available to service client requests during this long time period while the fsck program operates.

The Write Anywhere File Layout (WAFL) network file system protocol of the assignee was developed to avoid using conventional file system check programs, among other things. To avoid instances of lost or corrupted data files, particularly those which might occur after unclean shutdowns, WAFL records a consistency point, which describes the inodes 58 of the network file system protocol on a periodic basis. The consistency points may be taken frequently under normal operating loads of the network file computer system 50 (FIG. 2) and more frequently during periods of more intense use. In the event of an unclean shutdown, the file system 56 is quickly and easily restored to the last consistency point taken before the unclean shutdown by using the information from the consistency points which describes the file system inodes 58, rather than using a conventional file system check program to assure data consistency.

Each of the file system inodes allows the data files to be reconstituted as they existed just prior to the unclean shutdown. Thus, after an unclean shutdown and upon the restarting of the network file computer system 50 (FIG. 2), the root inode 58 allows the data files 60, 62, and 64 to be correctly restored to consistency through the meta-data stored within file inode 66 of the root inode 58. The root inode 58 is modified by each write operation to the disk drives 44 (FIG. 2) which involves a data file. Thus, the root inode 58 always represents the most current state of the data files on the hard disk drive with which it is associated in the file system.

Once the data has been successfully written to the hard disks 44 (FIG. 2), it is erased from the memory buffers 32 (FIG. 2). Accordingly, three different operations of the network file system protocol must be coordinated: storing data in the system memory 28' (FIG. 2), writing data from the system memory 28' (FIG. 2) to the hard disk drives 44 (FIG. 2), and taking the consistency point. Because of the size and complexity of a typical network file computer system, taking a consistency point can consume on the order of one second.

One method to temporally coordinate the acquisition of the consistency point and the writing of the data to the disk drives 44 (FIG. 2) is to suspend the writing of data to the hard disk drives 44 (FIG. 2) from the system memory 28' (FIG. 2) while the consistency point is acquired. In this manner, the consistency point will not miss any data recently written to the hard disk drives 44 (FIG. 2), and in the event of an unclean shutdown, the data in transition from the system memory 28' (FIG. 2) to the hard disk drives 44 (FIG. 2) is still retained in the system memory 28' (FIG. 2). However, briefly suspending the writing of data to disk drives, even for one second to acquire a consistency point, significantly reduces the data throughput and efficiency of the network file computer system 50 (FIG. 2). To achieve a high level of efficiency, WAFL writes data to the hard disk drives 44 (FIG. 2) and acquires consistency points on an essentially simultaneous basis. The process by which WAFL writes data and acquires consistency points is described more completely in U.S. Pat. No. 5,819,292 assigned to the present assignee. In addition to ensuring consistency and efficiency while obtaining consistency points, WAFL allows the clients to access prior versions of edited or deleted files by accessing previously-taken consistency points.

Figure 4:
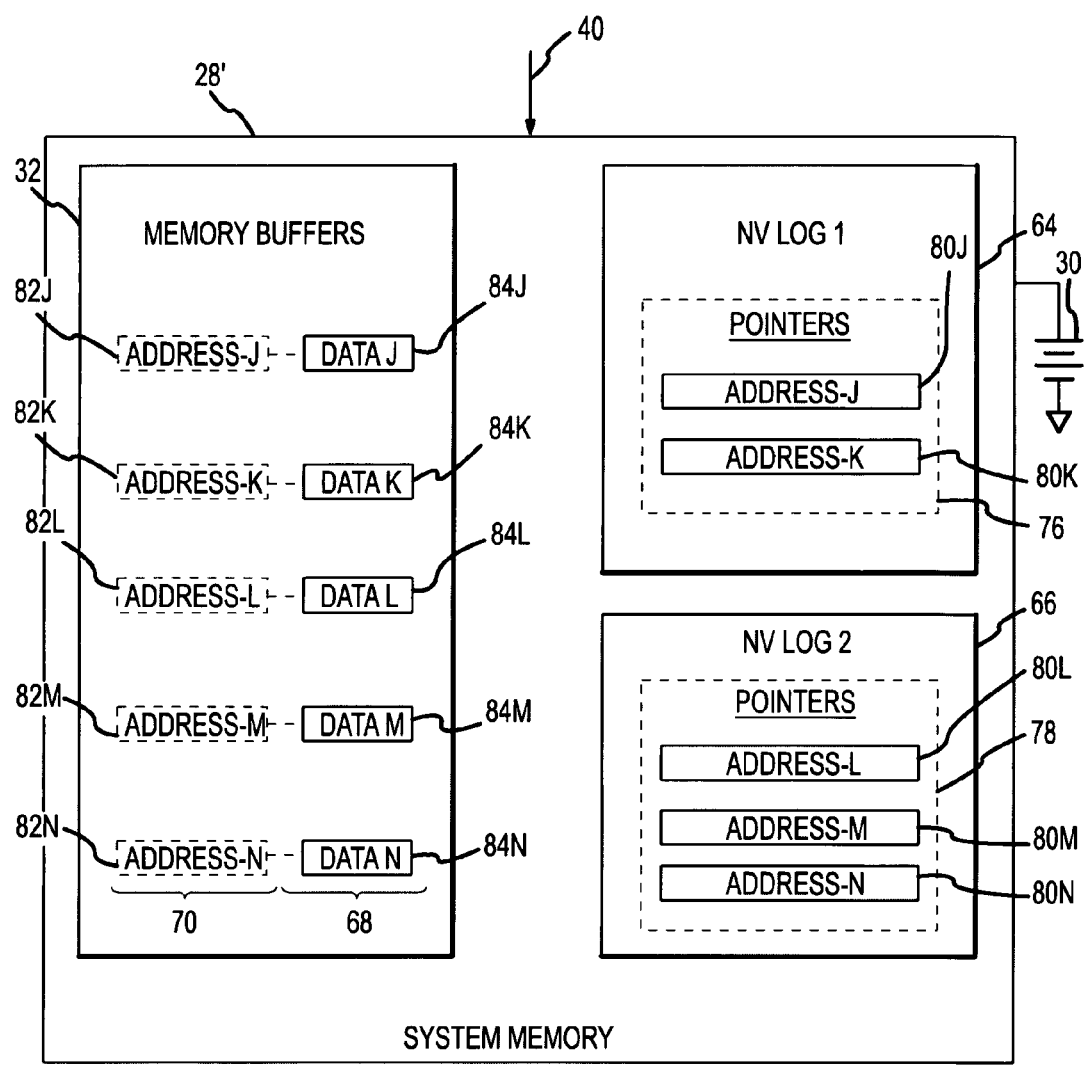
FIG. 4 is a block diagram illustrating in greater detail a nonvolatile system memory of the network file computer system shown in FIG. 2.

When receiving and storing the data in the NV memory buffers 32, pointers 76 and 78, which correspond to the addresses of the data stored in the memory buffers 32, are written in the NV logs 52 and 54, as shown in FIG. 4. The pointers 76 and 78 are used by the network file system protocol to access the data stored within the memory buffers 32 to enable the writing of the data stored in the memory buffers 32 to the hard disks 44. Writing the data can occur during the normal operation of the network file computer system 50 or after the network file computer system 50 is restarted after an unclean shutdown in order to complete unfulfilled client requests.

Once accessed using the pointers 76 and 78 in the NV logs 52 and 54, the data within the memory buffers 32 is associated with the client requests and is written to the hard disk drives 44 of the network file computer system 50 (FIG. 2). The system memory 28', including the NV logs 52 and 54, is compatible with WAFL network file system protocol of the assignee. Taking consistency points using the WAFL network file system protocol while data is written in a coordinated manner to the mass storage devices is also compatibly executed using the memory buffers 32 and the NV logs 52 and 54 in the system memory 28'.

The memory buffers 32 contain a plurality of individual buffers 68 for storing the data at addresses 70. The addresses 70 indicate and locate the data stored within the memory buffers 32. By way of example, the data J, K, L, M, and N referenced at 84J, 84K, 84L, 84M, and 84N, respectively, are stored using the plurality of individual buffers 68 within the memory buffers 32. The addresses 70 are address J, address K, address L, address M, and address N referenced at 80J, 80K, 80L, 80M and 80N, respectively. The addresses 80J-N respectively indicate and locate the data 84J-N with the memory buffers 32.

The NV logs 52 and 54 store the pointers 76 and 78, respectively. Pointers 76, such as pointer J and pointer K, referenced at 80J and 80K, are stored in the NV log 52. The pointers 80J and 80K correspond to or constitute the memory addresses 82J and 82K, respectively. Pointers 78, such as the pointers 80L, 80M and 80N, are stored in the NV log 54. The pointers 80L, 80M and 80N correspond to or constitute the memory addresses 82L, 82M and 82N, respectively. Other information, including client request information, necessary to constitute the nonvolatile logs is also stored in each of the NV logs 52 and 54.

Because the amount of information that is stored in the NV logs 76 and 78 includes only the pointers and not a full redundant copy of the data which is stored the memory buffers 32, more space is available in the system memory 28' to hold more data and NV logs, and fewer computational resources are consumed because it is not necessary to copy the data from the memory buffers 32 and store that redundant copy in the nonvolatile logs 36 and 38, as is the case with the prior art network file computer system 20 (FIG. 1). As a result, the network file computer system 50 is equally redundant and more efficient in achieving data throughput, compared to the prior art network file computer system 20 (FIG. 1).

Furthermore, the data resides within the memory buffers 32 until after that data is written to the disk drives 44 (FIG. 3). Until the data is successfully written to the disk drives 44 (FIG. 3), the data is protected against loss by the battery 30 (FIG. 3) which ensures a continuous supply of power to the system memory 28' in the event of an unclean shutdown or under commercial power outage conditions. Of course, the disk drives 44 (FIG. 3) are capable of retaining the data, once written, because the recording media of those disk drives does not require commercial power to maintain the data. Upon the restarting of the network file computer system 50 (FIG. 2) after an unclean shutdown, the memory buffers 32 and the NV logs 52 and 54 (including the pointers 76 and 78) are accessed and the data from the memory buffers 32 is subsequently written to one of the hard disk drives 44 (FIG. 3), thereby completing the pending client requests at the time of the unclean shutdown.

The use of the memory buffers 32 and the pointers 76 and 78 in the NV logs 52 and 54 and their interaction with the writing of the data to the hard disk drives 44, the acquiring of the consistency points, and the updating of the inodes to represent changes in the data files of the hard disk drives 44 during a number of different exemplary events, is illustrated in FIGS. 5A and 5B, FIGS. 6A and 6B, FIGS. 7A and 7B, FIGS. 8A and 8B, FIGS. 9A and 9B, and FIGS. 10A and 10B.

Figure 5A:
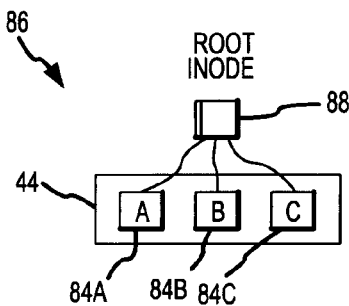
Figure 5B:
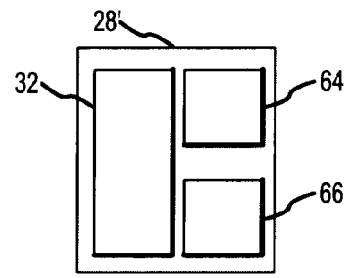

As shown in FIG. 5A, a first event 86 involves data 84A, 84B and 84C which have been written to the hard disk drives 44. The data 84A, 84B and 84C is defined by a root inode 88. The root inode 88 includes the inode file (not shown in FIG. 5A but shown at 66 in FIG. 2) for the data 84A, 84B, and 84C. The memory buffers 32 and NV logs 52 and 54 of the system memory 28' shown in FIG. 5B contain no data, because of an exemplary temporary absence of client requests. The root inode 88, which describes all of the data on the hard disks 44 (represented by the data 84A, 84B and 84C), is nonvolatile because the root inode 88 is stored to the disk drives 44.

Figure 6A:
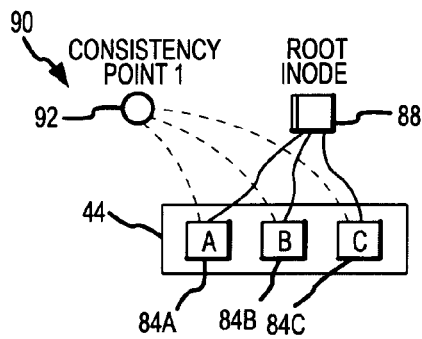
Figure 6B:
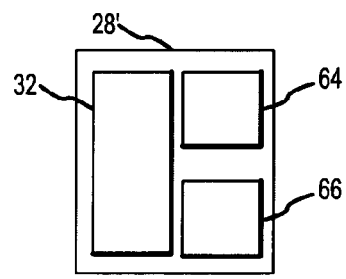
Figure 7A:
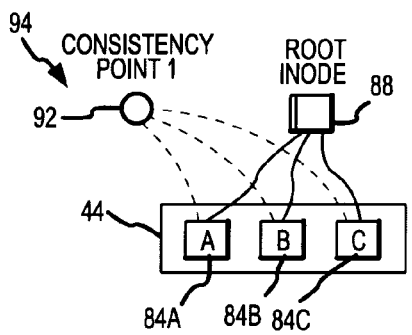
Figure 7B:
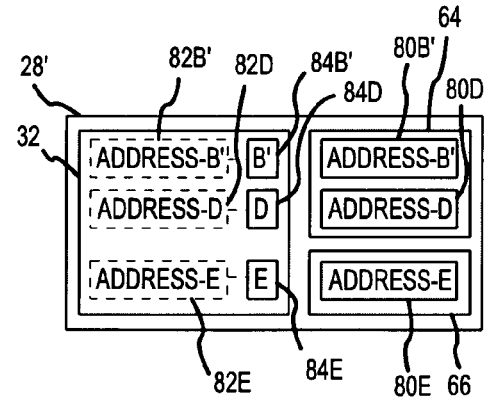

Thereafter, in a second event 90 illustrated in FIGS. 6A and 6B, a first consistency point 92 is acquired of the data 84A, 84B and 84C on the disk drives 44. The first consistency point 92 records the meta-data of the root inode 88 which defines the data 84A, 84B, and 84C. Accordingly, during the normal operation of the network file computer system 50 (FIG. 2) or if an unclean shutdown occurs after the first consistency point 92 has been acquired, the file system is maintained or can be restored by referencing the first consistency point 92 or the root inode 88. The first consistency point 92 and each subsequent consistency point are also written to the nonvolatile disk drives 44. If the unclean shutdown occurred after the first consistency point 92 had been acquired and after new data had been written to the disk drives 44, the inode 88 would have been updated by the new data written to the disk drives 44, because the inode 88 is updated on a continuous basis with each new instance of writing new data to the disk drives. Under this circumstance, the updated inode 88 would be used to reconstruct the status of the file system on the disk drives 44. Since new data is typically written to the disk drives 44 on a constantly occurring basis, the inode 88 represents the current status of changes to the data files on the disk drives 44. A third event 94 is shown in FIGS. 7A and 7B. The third event 94 involves receiving requests from the clients 22 (FIG. 3) to write data 84B', 84D and 84E to the disk drives 44. In response to the client requests, the data 84B', 84D and 84E is written in the system memory 28', as shown in FIG. 7B. Since the data 84A, 84B and 84C has already been written to the hard disk drives from the system memory 28', only the data 84B', 84D and 84E is recorded in the memory buffers 32 of the system memory 28'. The data 84B' represents a modification of the data file 84B which is now stored on the disk drives 44. The data 84D and the data 84E represent new data files which are to be stored on the disk drives 44. With the storing of the data 84B', 84D and 84E in the memory buffers 32, the pointers 80B', 80D and 80E corresponding to the memory addresses 82B', 82D and 82E of the data 84B', 84D and 84E, respectively, are stored in the first and second NV logs 52 and 54.

The data 84A, 84B, and 84C are securely stored on the hard disk drives 44, while the data 84B', 84D, and 84E are stored in the system memory 28' which is securely backed by the battery 30 (FIG. 3). In the event of an unclean shutdown before the data 84B', 84D, and 84E are written to the disk drives 44, the root inode 88 is used to restore the previous state of the data files on the disk drives 44, and the client request information and the pointers 80B', 80D, and 80E stored within the NV logs 52 and 54 are read and used to access the data 84B', 84D, and 84E stored within the nonvolatile memory buffers 32 at the addresses 82B', 82D and 82E. Thereafter, the data 84B', 84D, and 84E is written to the hard disk drives 44 as fulfillment of the client requests which were asserted prior to the unclean shutdown.

For purposes of illustration in FIG. 7B, the first NV log 52 is illustrated as having been filled by the pointers 80B' and 80D and other NV log information which describes the unfulfilled client requests. Because the first NV log 52 is filled, the pointer 80E is recorded in the second NV log 54. Whenever the first NV log 52 is filled, a consistency point of the file system is taken. A first consistency point 74 is illustrated in FIG. 7A. At the time the first consistency point 74 is taken, it reflects the status and content of the data files 84A, 84B and 84C on the disk drives 44. Because no new or modified data files have been written to the hard drives 44, the consistency point 74 essentially contains the same information as the root inode 88, with respect to the data in the data files 84A, 84B and 84C.

Figure 8A:
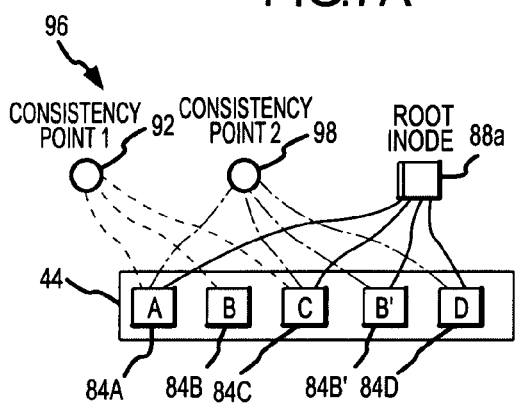
Figure 8B:
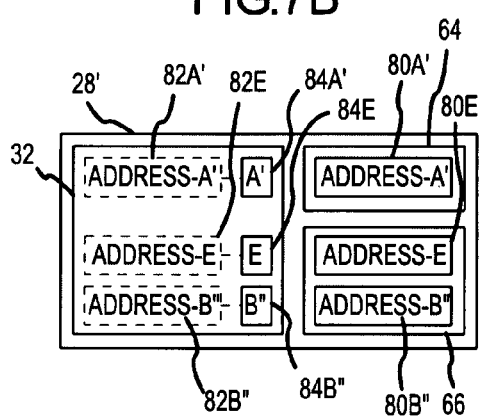

A fourth event 96 is illustrated in FIGS. 8A and 8B. In the fourth event 96, the data 84B' and 84D, but not the data 84E, in the memory buffers 32 (FIG. 7B) has been written to the disk drives 44, and the root inode has been updated at 88a to represent that the data 84B' and 84D has been written to the disk drives 44.

After the writing of the data 84B' and 84D to the disk drives 44 and after receiving acknowledgment that the data 84B' and 84D have been successfully written to the disk drives 44, and the taking of the second consistency point 98, additional client requests to write data 84A' and 84B" to the disk drives 44 are received in the system memory 28'. The data 84B", which represents a modification of the file data 84B', is stored in the memory buffers 32, while the data 84A' is stored in the memory buffers 32. Upon storing the data 84A' and 84B", memory addresses 82A' and 82B' for the data 84A' and 84B" are stored as pointers 80A' and 80B" in the first NV log 52 and the second NV log 54, respectively. The data 84A' is stored in the memory buffers 32 and its pointer 80A' stored in the first NV log 52 because the second NV log 54 was filled after the storing of the pointer 80B". Because the data 84E has not yet been written from the system memory 28', the data 84E remains in the system memory 28'.

Since the second NV log 54 has been filled with the pointers 80E and 80B", a second consistency point 98 is taken. The second consistency point 98 captures the state of the root inode 88a, which includes the meta-data to define the data files 84A, 84B', 84C, and 84D. If an unclean shutdown then occurs, the data files on the disk drives 44 can be restored to their most current state by using the root inode 88a. Alternatively, the second consistency point 98 could also be used to restore the data files on the disk drives 44 to their most current state, provided that the unclean shutdown occurred before the root inode 88a was modified by other, subsequently-occurring data written to the disk drives 44.

The older, first consistency point 92 is not used to restore the most recent state of the file system. Rather, older consistency points, such as the first consistency point 92, allow an original or earlier version of an edited or deleted data file to be obtained when it has been accidentally edited, corrupted or deleted. For example, since the data file 84B' is a modified version of data file 84B, if the original data file 84B is required in the future, access to the original data file 84B is available through the first consistency point 92.

The data 84A, 84B, 84C, 84D, and 84B' are securely stored on the hard disk drives 44, while the data 84A', 84B", and 84E and their corresponding pointers 80A', 80B", and 80E are stored in the system memory 28' which is backed by the battery 30 (FIG. 3). In the event of an unclean shutdown before the data 84A', 84B", and 84E are written to the hard disk drives 44, the data 84A', 84B", and 84E are retained within the memory buffers 32 and their corresponding pointers 80A', 80B", and 80E are retained within the NV logs 52 and 54. Upon the restarting of the network file computer system 50 (FIG. 2) after the unclean shutdown, the NV logs 52 and 54 are read and the pointers 80A', 80B", and 80E are used to access and write the data 84A', 84B", and 84E to the hard disk drives 44 in fulfillment of the pending client requests.

A fifth event 100 is shown in FIGS. 9A and 9B. The fifth event 100 occurs after data files 84E and 84B" have been written to the disk drives 44, but before the data file 84A' has been written to the disk drives 44.

For purposes of illustration, a third consistency point 102 is next taken, such as would occur after a certain maximum predetermined time has elapsed for taking a subsequent consistency point, regardless of the number of file system operations which have been performed since the previous consistency point 98 was taken. The third consistency point 102 captures the current state of the root inode 88b, which includes the meta-data for the data files 84A, 84B", 84C, 84D, and 84E, since the data 84E and 84B has been written to the disk drives 44, but before the data file 84A' has been written to the disk drives 44. In the event of an unclean shutdown after the taking of the third consistency point 102, the file system is restored to include the data files 84A, 84B", 84C, 84D, and 84E as defined by the inode 88b. The first and second consistency points 92 and 98 allow access to the data files 84B and 84B' which are the prior versions of the current data file data 84B".

After the writing of the data 84B" and 84E to the hard disk drives 44 and the taking of the third consistency point 102, no further client requests are accepted because, for purposes of illustration, a decision has been made to intentionally and properly turn off the network file computer system 50 (FIG. 2) through a clean shutdown. After acknowledging the writing of the data 84B" and 84E to the hard disk drives 44, the data 84B" and 84E and the associated pointers 80B" and 80E are erased from the system memory 28'.

A sixth event 104 is illustrated in FIGS. 10A and 10B. Prior to turning off of the network file computer system 50 through the clean shutdown, the last of the data 84A' stored within the memory buffers 32 (FIG. 9B) written to the disk drives 44, the root inode is updated at the root inode 88c to reflect the data 84A' which has been written to the disk drives 44, the data 84A' is erased from the memory buffers 32, and a fourth consistency point 106 is taken. The fourth consistency point 106 defines the last state of the data files on the disk drives 44 after writing the data 84A' to the disk drives 44 prior to the clean shut down, and also represents the last present state of the root inode 88c.

Prior to the clean shutdown, the first consistency point 92 and the data file 84B (FIGS. 6A, 7A, 8A, 9A) are permanently erased from the disk drives 44 in order to provide additional storage space. Upon erasing the first consistency point 92, access to the data file 84B is no longer available.

For purposes of illustration in FIGS. 5B-10B, only a limited number of pointers and data are shown stored in the system memory 28'. However, in actual operation the system memory 28' is capable of accommodating hundreds or thousands of client requests and file system operations. Further, the system memory 28' is illustrated within a network file computer system using WAFL that relies upon two NV logs 52 and 54. However, a system memory with different configurations can employ the present invention, and the present invention need not be used exclusively with network file computer systems which use WAFL.

The improvements and advantages of the present invention are significant. A nonvolatile system memory of a network file computer system stores only a single copy of the data involved in a client request and pointers in nonvolatile logs. Storing the pointers in the nonvolatile logs conserves system memory because the data to be written in response to the client request is not unnecessarily duplicated within the nonvolatile system memory. In addition, the elimination of the need to duplicate data in the nonvolatile system memory increases processing efficiency by reducing the number of operations required.

The significance of the previously discussed and other improvements and advantages will become apparent upon gaining a full appreciation of the ramifications and improvements of the present invention. Preferred embodiments of the invention and many of its improvements have been described with a degree of particularity. The description is of preferred examples of implementing the invention, and the description is not necessarily intended to limit the scope of the invention. The scope of the invention is defined by the following claims.

The invention claimed is:

1. A method of storing data to nonvolatile mass storage in a network file computer system which includes a server computer and a plurality of client computers which execute a file system protocol, the server computer including a nonvolatile system memory, the method comprising:

sending data and a client request to store the data in the mass storage from a client computer to the server computer;

temporarily storing a single copy of the data in the nonvolatile system memory;

establishing a nonvolatile log which defines the data and each client request in the nonvolatile system memory;

establishing a pointer as a part of the nonvolatile log for each client request, the pointer identifying a memory address within the nonvolatile system memory wherein the single copy of the data is temporarily stored;

updating a nonvolatile inode which includes information that defines the present contents of the nonvolatile mass storage with each change in data written to the nonvolatile mass storage;

periodically obtaining nonvolatile consistency points which each define contents of the mass storage when the nonvolatile consistency points are acquired; and recovering from an unclean shutdown by using one of the nonvolatile consistency points, the inode, the pointers, and the client requests within the nonvolatile log to restore the nonvolatile mass storage to a previous state existing before the unclean shutdown and to execute the client requests pending before the unclean shutdown.

2. A method as defined in claim 1, further comprising:

erasing the single copy of the data and the pointer to that data from the system memory after the data is written to the mass storage.

3. A method as defined in claim 1, wherein the aforementioned nonvolatile log is a first nonvolatile log, the nonvolatile system memory further comprises a second nonvolatile log, and the method further comprises:

storing the pointer for the data associated with each client request in one of the first or second nonvolatile logs.

4. A method as defined in claim 3, further comprising:

erasing from the system memory each of the pointers used; and erasing from the system memory each of the single copies of the data.

5. A network file computer system, comprising:

a plurality of client computers;

a server computer;

a nonvolatile mass storage device for storing data;

a communication path connecting the client computers, the server computer and the mass storage device by which to communicate data, client requests and other information between the server and client computers and the mass storage device;

a nonvolatile system memory included within the server, the nonvolatile system memory including memory buffers and a nonvolatile log portion; and programmed instructions executed by the server and client computers which establish a network file system protocol which governs the storage of data in the mass storage device in response to client requests originated by the client computers, the programmed instructions of the network file system protocol operatively:

storing temporarily in one of the memory buffers a single copy of data originating from one of the client computers at a predetermined address within the memory buffers;

storing temporarily in the nonvolatile log portion a pointer identifying the predetermined address of the single copy of the data stored in the one memory buffer;

storing temporarily in the nonvolatile log portion a client request containing information describing the storage of the single copy of the data stored in the one memory buffer on the mass storage device;

accessing the single copy of the data stored in the one memory buffer by using the pointer stored in the nonvolatile log portion; and updating a nonvolatile inode which includes information that defines the present contents of the mass storage device with each change in data written to the mass storage device;
periodically obtaining nonvolatile consistency points which each define contents of the mass storage device when the nonvolatile consistency points are acquired; and
recovering from an unclean shutdown by using one of the nonvolatile consistency points, the inode, the pointer, and the client request within the nonvolatile log to restore the mass storage device to a previous state existing before the unclean shutdown and to execute the client request pending before the unclean shutdown.

6. A network file computer system as defined in claim 5, wherein the network file system protocol operatively:
erases from the nonvolatile system memory the single copy of the data, the pointer and the client request after the single copy of the data has been successfully written to the mass storage device.

7. A network file computer system as defined in claim 5, wherein the nonvolatile system memory comprises first and second nonvolatile log portions, and the network file system protocol operatively:
stores the data associated with each of a plurality of client requests in the memory buffers;
stores the pointer for the data associated with each client request in one of the first or second nonvolatile logs; and
acquires additional consistency information upon either one of the nonvolatile log portions becoming filled.

8. A network file computer system as defined in claim 7, wherein the network file system protocol operatively:
fills the first nonvolatile log portion; and thereafter
stores further pointers in the second nonvolatile log portion.

9. A network file computer system as defined in claim 8, wherein the network file system protocol operatively:
erases from the memory buffers the data successfully written to the mass storage device.

* * * * *